United States Patent [19]
Jones, Jr.

[11] 3,739,936
[45] June 19, 1973

[54] POUR HOLE CLOSURE FOR FOAM MOLD

[75] Inventor: Paul W. Jones, Jr., Louisville, Ky.

[73] Assignee: General Electric Company, Louisville, Ky.

[22] Filed: Sept. 17, 1971

[21] Appl. No.: 181,303

[52] U.S. Cl......... 220/86 R, 137/525.3, 220/24 R, 249/105, 425/817
[51] Int. Cl...................... B65d 49/02, F16k 21/04
[58] Field of Search...................... 220/86 R, 24 R; 137/52.3; 249/105; 425/4 R, 817 R

[56] References Cited
UNITED STATES PATENTS

| | | | |
|---|---|---|---|
| 2,803,370 | 8/1957 | Lennard | 220/24 R |
| 2,576,192 | 11/1951 | Poznik | 220/86 R |
| 3,334,779 | 8/1967 | Smith | 220/86 R |
| 3,478,922 | 11/1969 | Mole | 220/86 R |
| 3,132,382 | 5/1964 | Magester | 249/105 X |
| 3,364,941 | 1/1968 | Harder | 137/525.3 |

Primary Examiner—Leonard Summer
Attorney—Frank L. Neuhauser, Walter E. Rule, Francis H. Boos et al.

[57] ABSTRACT

A closure for closing the pour hole of a foam mold cavity such as a refrigerator cabinet comprises a body member having peripheral means for sealingly engaging the edge of the pour hole and a central sheet-like portion covering the pour hole and having a plurality of slits therein intersecting at substantially the center thereof to define a plurality of resilient flaps. A liner of flexible foam resin is secured to the mold side of the central portion and is divided into a plurality of sections by slits intersecting substantially at the point of intersection of the slits in the central portion. The sections are secured to the flaps by a flexible, elastic adhesive so that both the flaps and the sections can be deformed to allow insertion of a conduit through the closure. The flaps and the sections secured thereto return to their normal positions after removal of the conduit in which position the liner sections deform under the pressure of the expanding foam and seal the slits therein.

5 Claims, 5 Drawing Figures

PATENTED JUN 19 1973 3,739,936

INVENTOR
PAUL W. JONES JR.
BY Walter W. Nihl
HIS ATTORNEY

POUR HOLE CLOSURE FOR FOAM MOLD

BACKGROUND OF THE INVENTION

In the manufacture of resin foam insulated refrigerated cabinets and the like, the outer shell and inner shell of the cabinet are assembled in their final positions and while supported in a suitable fixture, a foamable resin mixture such as a polyurethane foam is introduced into the space between the shell and liner where it expands to fill this entire space prior to complete solidification. For the purpose of introducing the foamable resin, the liner and shell are usually positioned face down and one or more openings are provided in the back wall of the shell for introduction of the foamable resin. During foaming of the resin mixture, the gases such as air and a small amount of the gaseous foaming agent must be allowed to escape through the pour opening; otherwise these trapped gases will prevent the foam from filling all of the space between the shell and liner. However, for appearance reasons and also to permit the generation of the desired foam pressures within the cabinet walls, it is desirable to close these pour holes before any of the foaming resin passes therethrough. To this end, it has been common practice for the operator to watch the expansion of the foaming resin and to insert a solid plug into the pour hole at about the time that most of the air and other gases have escaped and the foaming resin approaches the pour hole. It has also been proposed to employ pour hole closure means which can be pre-assembled with the cabinet shell prior to introduction of the foamable resin. Such closure means are disclosed, for example, in U.S. Pat. No. 3,132,382-Magester issued May 12, 1964 and U.S. Pat. No. 3,364,941-Harder issued Jan. 23, 1968. These closure means have been relatively expensive and due to their construction have not always operated satisfactorily in that the components for assuring the seal against the expanding foam have sometimes failed to return to their proper positions under the action of the expandable foam.

SUMMARY OF THE INVENTION

The present invention is directed to an improved pour hole sealer for a foam mold cavity, the sealer or closure member being of relatively low cost and being adapted to provide a positive seal against the escape of foaming resin at the pressures created thereby.

In accordance with the preferred embodiment, the pour hole closure or seal comprises a plastic body member having peripheral means for sealingly engaging the edges of the pour hole and a central sheet-like portion covering the pour hole. The central portion has a plurality of slits which intersect at substantially the center thereof to define a plurality of resilient flaps which normally occupy a substantially common plane. A liner of flexible foamed resin is secured to the mold side of the central portion and this liner also has slits which intersect substantially at the same point as the slits in the central portion and which are preferably offset from the slits in the central portion. By this construction both the flaps and the sections can be deformed to allow passage of a foam nozzle or conduit through the closure for the introduction of a foamable resin mixture into the mold. Further, the flaps have a composition and thickness such that they will return to their normal positions after withdrawal of the conduit carrying with them the liner sections which are preferably flexibly secured to the flaps so that in their normal position, the liner sections will deform due to the fluid pressure of the expanding foam to seal the slits therein and thereby prevent escape of the foaming resin through the closure means.

DESCRIPTION OF THE PREFERRED EMBODIMENT

While the present invention is applicable to the filling of any hollow structure or mold with a foamable resin which can be poured into the hollow structure or mold prior to foaming and then caused to expand in the mold, it will be particularly described in connection with the manufacture of insulated refrigerator cabinet in which the hollow walls defined by the spaced shell and liner define a mold cavity which is filled with the liquid foamable resinous material such as a polyurethane resin.

Figure 1:
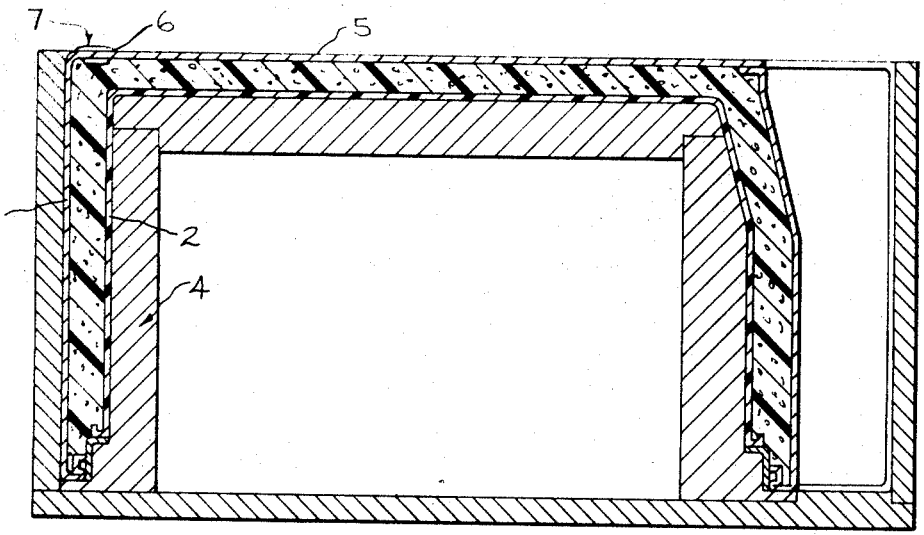
FIG. 1 is a view, in section, of an embodiment of the present invention in the form of a refrigerator cabinet.

Accordingly, in FIG. 1 of the drawing there is shown, in section, a refrigerator cabinet including a shell 1 and liner 2 which are supported face down and in spaced relationship on a foaming fixture generally indicated by the numeral 4 and adapted to support both liner and shell walls during the foaming operation.

Thus assembled, the spaced liner and shell of the cabinet in effect form a closed mold of the type in which the mold walls are part of the final molded product. For the purpose of introducing a foamable resin mixture into the spaces between the liner and shell, the back wall 5 of the shell, which in effect forms the top wall of the mold, is provided with at least one pour hole 6 through which a foam-producing resinous material is introduced for expansion within the hollow walls of the cabinet.

Figure 2:
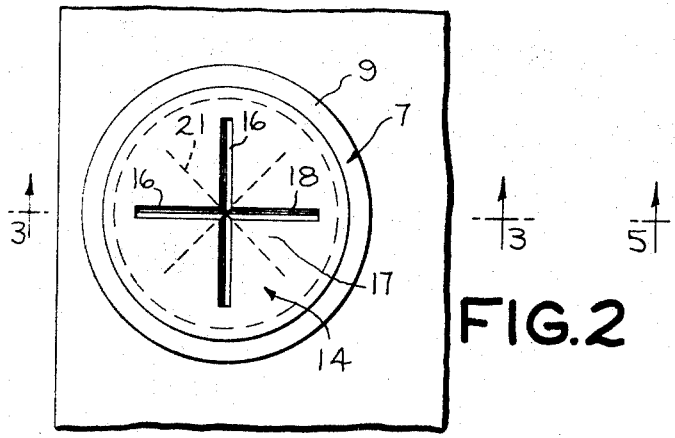
FIG. 2 is a plan view of the foam pour hole closure of the present invention.
Figure 3:
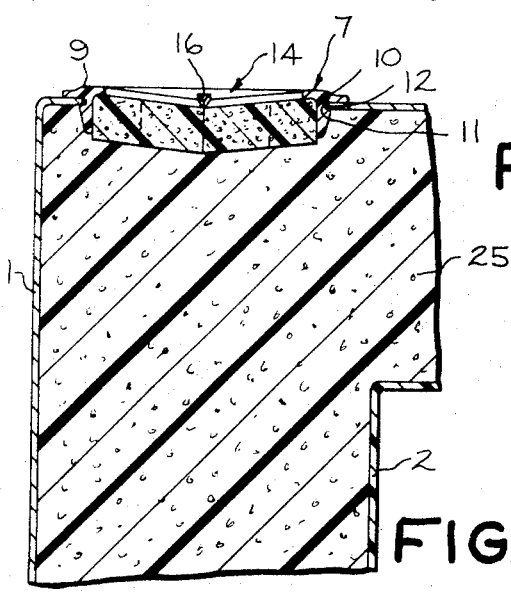
FIG. 3 is a sectional view taken along line 3—3 of FIG. 2.

The pour hole closure 7 as shown in the remaining FIGURES of the drawing, particularly FIGS. 2 and 3 thereof, comprises a somewhat flexible but self-supporting one-piece member 9 molded from a suitable resin such as polyethylene or polypropylene and including a peripheral section 10 having a groove 11 which receives the edge 12 of the pour hole 6 to secure the closure 7 within that pour hole. The central portion 14 of the member 9 is of a sheet-like construction having, as is shown in FIG. 2, a pair of slits 16 which intersect at substantially the center of the closure and preferably terminate short of the peripheral flange 10. These intersecting slits 16 form pointed flaps 17 which are contiguously juxtaposed in their normal positions, or in other words, lie substantially in a common plane. The top or outer edges of the flaps 17 may be bevelled as indicated by the numeral 18 to facilitate molding of the slits.

The closure 7 also includes a liner 20 of a flexible foam such as a polyethylene foam which is secured to the back or mold side of the member 9 at least at the periphery thereof. This liner 20 also has two intersecting slits 21 shown in dotted lines in FIG. 2 of the drawing which intersect at about the same point as the slits 18 to form a plurality of sections 21. The liner 20 is adhesively secured using a flexible pressure sensitive adhesive such as Packaging Service Corp. No. 200, which is a flexible pressure sensitive adhesive with high bonding strength, at least about its periphery to the body portion 9 and for best results it is also adhesively secured with such a flexible adhesive to at least portions of the flaps 17.

Figure 4:
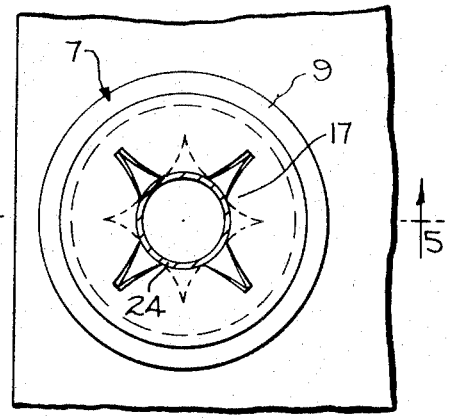
FIG. 4 is a view similar to FIG. 3 illustrating the operation of the closure during introduction of foam therethrough.
Figure 5:
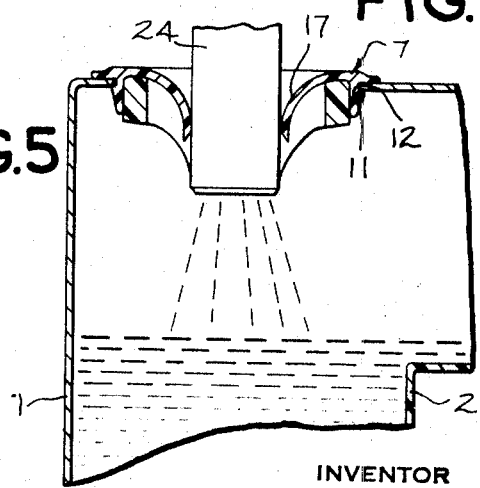
FIG. 5 is a sectional view taken along line 5—5 of FIG. 4.

In the use thereof, the closure 7 is inserted into the pour hole 6 prior to the introduction of the foam. Thereafter, as is shown in FIGS. 4 and 5 of the drawing, a foam conduit or nozzle 24 is inserted axially through the closure 7 and as the conduit 24 moves downwardly through the closure member 7, it forces the flaps 17 away from each other at the point of intersection so that each flap bends about its base. At the same time, the commonly intersecting slits 21 and the liner 20 permit the liner segments 21 to deflect so that after the conduit 24 is inserted, the flaps 17 and the segments 21 cooperatively form a collar about the periphery of the conduit or nozzle 24 as shown in FIG. 4 to wipe any foam resin from the conduit during removal thereof.

After a sufficient quantity of foamable resin has been introduced, the flow of resin through the conduit 24 is shut off and the conduit is withdrawn. The resilient nature of the flaps will then cause them to return to their initial positions as illustrated in FIG. 3 of the drawing carrying with them the sections 21. In this position, the narrow slits 16 and 21 still permit the escape of gases from within the space between the shell 1 and liner 2. However, when the expanding or foaming resin indicated by numeral 25 expands into contact with the liner 20, as shown in FIG. 3, it permeates the liner and at the same time compresses it causing the slits 21 in the liner 20 to completely close to provide a seal preventing escape of the foaming resin through the pour opening.

Preferably, the slits 21 in the liner 20 are angularly offset from the slits 16 in the body member so that the flaps 17 overlie the slits 21 and provide an additional seal to prevent the egress of the foaming resin. The closure member 7 is of course foamed in place on the cabinet shell. In other words, it is secured to the foam and thereby provides a permanent closure resisting moisture absorption through the pour opening by the foam.

While there is shown and described a particular embodiment of the invention, it is understood that it is not limited thereto and it is intended by the appended claims to cover all such modifications as involved in the spirit and scope of the invention.

I claim:

1. A foam mold pour hold closure for permitting passage of a conduit through said closure for introducing a foamable resin into a mold cavity and for sealing the pour hole against foam leakage upon withdrawal of the conduit, said closure comprising:
   a body member having peripheral means for sealingly engaging the edge of said pour hole and a central resilient sheet-like portion covering said pour hole;
   said central portion having a plurality of slits therein intersecting at substantially the center thereof to define a plurality of flaps normally occupying a substantially common plane;
   a liner of flexible foamed resin flexibly secured to the mold cavity side of said central portion and having intersecting slits intersecting substantially at the point of intersection of said slits in said central portion to form a plurality of sections;
   whereby both said flaps and said sections may be deformed to allow passage of a conduit through said closure to said mold cavity side and upon withdrawal of said conduit, said flaps with said sections secured thereto will return to their normal positions in which fluid pressure of the expanding foamable resin on said liner sections will compress and deform said liner sections to seal the slits therein.

2. The closure of claim 1 in which said body member and liner are provided with two intersecting slits.

3. The closure of claim 1 in which the body member and liner slits are angularly offset from one another.

4. An inlet closure for a foam mold permitting passage of a conduit through the mold inlet for introducing a foamable resin into the mold cavity and sealing the inlet against foam leakage upon withdrawal of the conduit, said closure comprising:
   a molded, one-piece body member of resilient plastic material having peripheral means for sealingly engaging the edge of said inlet and a central sheet-like portion covering said inlet;
   said central portion having a plurality of slits therein intersecting at substantially the center thereof to define a plurality of pointed flaps normally occupying a substantially common plane;
   a liner of flexible foamed resin flexibly secured to the inner side of said central portion having slits intersecting substantially at the point of intersection of said slits in said central portion to form a plurality of sections;
   whereby both said flaps and said sections may be deformed to allow passage of a conduit axially through said closure means to said inner side and upon withdrawal of said conduit, said flaps with said sections secured thereto will return to their normal positions in which the expanding foamable resin will permeate and compress said liner sections to seal the slits therein.

5. The inlet closure of claim 4 in which the body member and the liner each have two slits and the slits in one are angularly offset from the slits in the other.

* * * * *